(12) United States Patent
Hurlburt et al.

(10) Patent No.: US 8,123,306 B2
(45) Date of Patent: Feb. 28, 2012

(54) TRAILER CONNECTION SELECTOR

(75) Inventors: Keith Alan Hurlburt, Macungie, PA (US); David Willard Howell, Macungie, PA (US)

(73) Assignees: Volvo Group North America, LLC, Greensboro, NC (US); Bendix Commercial Vehicle Systems LLC, Elyria, OH (US)

( * ) Notice: Subject to any disclaimer, the term of this patent is extended or adjusted under 35 U.S.C. 154(b) by 712 days.

(21) Appl. No.: 12/286,536

(22) Filed: Sep. 30, 2008

(65) Prior Publication Data

US 2010/0078278 A1 Apr. 1, 2010

(51) Int. Cl.
*B60T 13/40* (2006.01)
(52) U.S. Cl. ............................................. 303/7; 303/71
(58) Field of Classification Search .............. 188/112 R; 303/7, 8, 9.76, 71
See application file for complete search history.

(56) References Cited

U.S. PATENT DOCUMENTS

| | | | | |
|---|---|---|---|---|
| 4,017,125 A | * | 4/1977 | Durling | 303/7 |
| 4,368,926 A | * | 1/1983 | Bartholomew | 303/7 |
| 4,397,505 A | * | 8/1983 | Linkner, Jr. | 303/9 |
| 5,226,692 A | * | 7/1993 | Eberling | 303/8 |
| 5,466,053 A | * | 11/1995 | Koelzer | 303/7 |
| 7,597,406 B2 | | 10/2009 | Judy, II | |
| 2009/0236904 A1 | * | 9/2009 | Ripley et al. | 303/122.15 |
| 2009/0302674 A1 | * | 12/2009 | Hurlburt et al. | 303/8 |
| 2010/0168974 A1 | * | 7/2010 | Bradley, IV | 701/70 |
| 2010/0181823 A1 | * | 7/2010 | Eberling | 303/9.76 |

* cited by examiner

*Primary Examiner* — Christopher Schwartz
(74) *Attorney, Agent, or Firm* — Potomac Patent Group PLLC

(57) ABSTRACT

A truck includes a pressurized air supply system for providing air to one of a plurality of air supply connections and a selector circuit for providing selection to one of the air supply connections. The circuit includes a first inversion valve with supply from a selector valve and control from a parking brake valve, a second inversion valve with supply from the parking brake valve and delivery to a first air supply connection, a synchro valve with supply from the parking brake valve and delivery to a second air supply connection, a double check valve with supply from the first inversion valve and the synchro valve and delivery to a control line of the second inversion valve and the synchro valve, a first trailer supply connection to the delivery line of the second inversion valve, and a second trailer supply connection to the delivery line of the synchro valve.

20 Claims, 4 Drawing Sheets

| Control | Supply | Delivery |
|---------|--------|----------|
| 0 | 0 | 0 |
| 0 | 1 | 1 |
| 1 | 0 | 0 |
| 1 | 1 | 0 |

Inversion Valve 1

FIG. 3A

| Control | Supply | Delivery |
|---------|--------|----------|
| 0 | 0 | 0 |
| 0 | 1 | 1 |
| 1 | 0 | 0 |
| 1 | 1 | 0 |

Inversion Valve 2

FIG. 3B

| Control | Supply | Delivery |
|---------|--------|----------|
| 0 | 0 | 0 |
| 0 | 1 | 0 |
| 1 | 0 | 0 |
| 1 | 1 | 1 |

Synchro Valve

FIG. 3C

TRAILER CONNECTION SELECTOR

BACKGROUND

This invention relates to tractor-trailers and more particularly, to systems that facilitate efficient pneumatic connection between a tractor and a trailer.

Tractor-type trucks are designed to tow trailers and semi-trailers having large loads. The loads may include goods, supplies or other freight. Tractor trucks and trailers rely on air pressure for brake control. Air is supplied by the tractor to the trailer via air hoses. Pneumatic interconnection between the tractor and trailer is made by the well known "glad-hand" devices. A glad hand from the tractor can be coupled to a glad hand from the trailer to provide an air-tight seal.

A truck, made up of a tractor and a trailer for example, has two types of brakes. These are service brakes and parking brakes. Parking brakes may also be referred to as emergency brakes or as spring brakes.

In order to permit vehicle motion, pressurized air is used to compress the emergency brake springs (i.e. to release the emergency brake). In order to stop the vehicle using the emergency brake (i.e. to apply the emergency brake), the springs are released by releasing the pressurized air from the spring brake chambers. The air system is used to engage or disengage the brakes on a truck. Pressurized air (or, high pressure air) in the brake system is supplied by a compressor powered by the engine.

The tractor portion of a truck can be designed to connect with the air lines of the trailer at one of a number of locations (of the tractor). While a tractor is usually designed with one set of glad hands, the tractor can also be designed with two sets of glad hand connections. A tractor with two sets of glad hand connections as illustrated in FIG. 1. Tractor 100 may include glad hands 115 at the backside of a cab portion 110 and glad hands 125 near the rear end of the chassis frame 120. One or the other of these glad hands 115 and 125 (but not both) will be connected to a trailer. Only one glad hand can supply the pressurized air. A trailer (not illustrated) includes at least a set of glad hands that can be connected to one of glad hand 115 and 125. The glad hand that is connected to the trailer provides or supplies pressurized air to the trailer (while the glad hand that is not connected to the trailer cannot supply air). The connection via glad hands 115 can be referred to as the semi position connection while the connection via glad hands 125 can be referred to as the full position connection.

Depending on the type of trailer being attached to the tractor, one of the two sets of glad hands 115 and 125 is utilized to supply air. Currently, switching the air supply between the sets of glad hands involves manual reconfiguration. Multiple valves may have to be turned or plugged and hose connections have to be disconnected and reconnected. Such actions increase the time and labor costs. These actions are also subject to human errors.

Other systems have been proposed that include a selector for switching between the different sets of glad hands. The location of these selectors makes them susceptible to being accidentally switched from one source to another by conditions on the road such as a pebble hitting the selector for example. Such switch in air delivery from one set of glad hands connected to the trailer to another set of glad hands not connected to the trailer while the vehicle is in motion leads to undesirable consequences. In some situations, it is also preferable to place the selector in a secure location.

What is desired, therefore, is a selection mechanism that is secure and is incapable of switching connections while the vehicle is in motion or while the emergency brakes are released.

SUMMARY

In one embodiment, a truck is disclosed. The truck comprises a pressurized air supply system for providing air to one of a plurality of air supply connections, and a selector circuit for providing selection to one of the air supply connections. The circuit further comprises: a first inversion valve having a supply line connected to a selector valve and a control line connected to a parking brake valve, a second inversion valve having a supply line connected to the parking brake valve and a delivery line connected to a first one of the air supply connections, a synchro valve having a supply line connected to the parking brake valve and a delivery line connected to a second one of the air supply connections, a double check valve with supply lines connected to a delivery line of each of the first inversion valve and the synchro valve and a delivery line connected to a control line of each of the second inversion valve and the synchro valve, a first trailer supply connection to the delivery line of the second inversion valve, and a second trailer supply connection to the delivery line of the synchro valve.

In another embodiment, a system for providing air to one of a plurality of air supply connections in a tractor hauling a trailer is disclosed. The system comprises: a first inversion valve having a supply line connected to a solenoid valve and a control line connected to a parking brake valve, a second inversion valve having a supply line connected to the parking brake valve, a synchro valve having a supply line connected to the parking brake valve, a double check valve connected to a delivery line of each of the first inversion valve and the synchro valve and to a control line of each of the second inversion valve and the synchro valve, a first trailer supply connection connected to a delivery line of the second inversion valve, and a second trailer supply connection connected to a delivery line of the synchro valve.

In a further embodiment, a method of selecting a glad hand connection on a tractor for supplying pressurized air to a trailer is disclosed. The method comprises: applying spring brakes of the tractor, selecting one of a plurality of glad hand connections of the tractor, releasing the spring brakes, supplying air to the selected glad hand connection, and maintaining air supply to the selected connection until applying the spring brakes and selecting another glad hand connection.

BRIEF DESCRIPTION OF THE DRAWINGS

The several features, objects, and advantages of Applicants' invention will be understood by reading this description in conjunction with the drawings, in which:

FIGS. 3A-3C illustrate state tables for various valves utilized in the circuit of FIG. 2.

DETAILED DESCRIPTION

The following description of the implementations consistent with the present invention refers to the accompanying drawings. The same reference numbers in different drawings identify the same or similar elements. The following detailed description does not limit the invention. Instead, the scope of the invention is defined by the appended claims.

Figure 1:
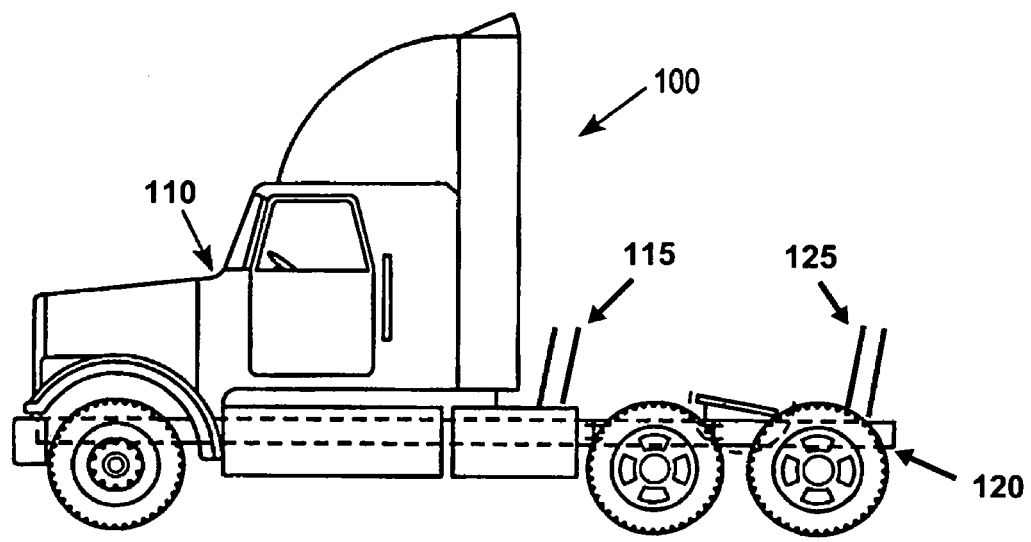
FIG. 1 illustrates a tractor with multiple glad connections.
Figure 2:
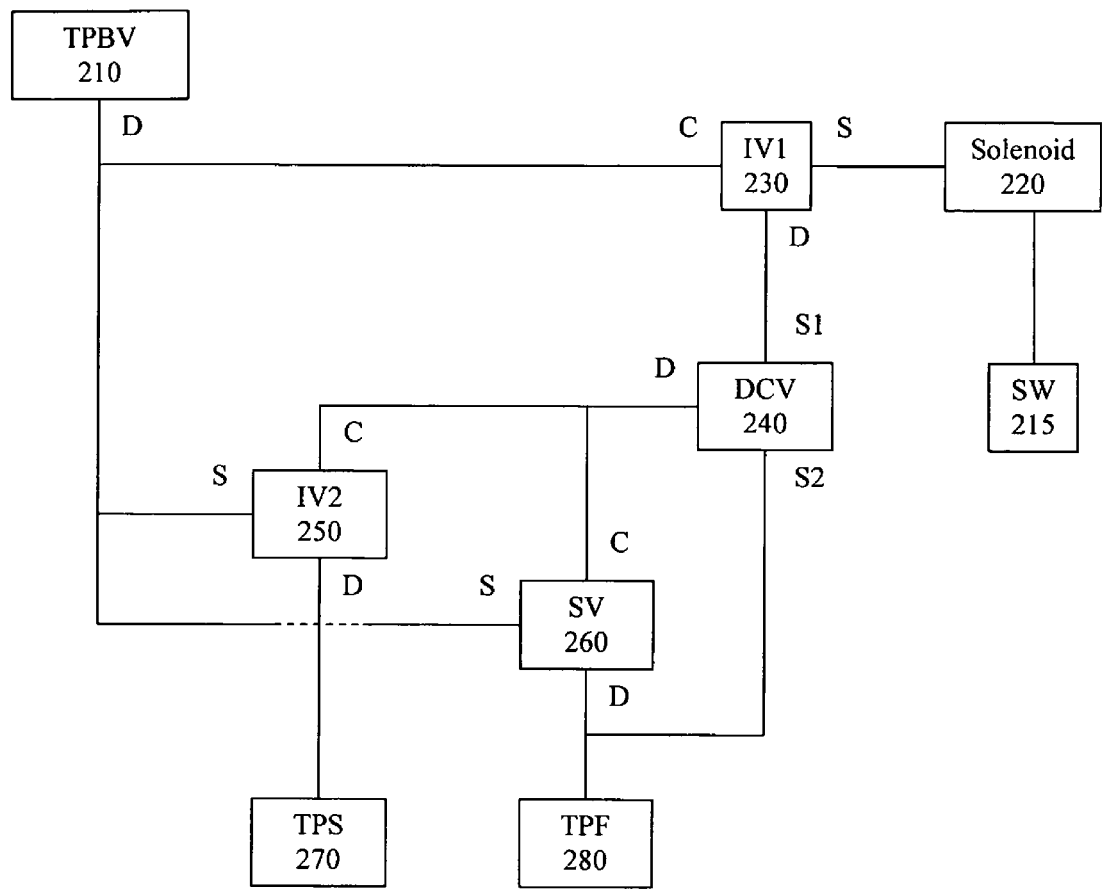
FIG. 2 illustrates a selector circuit in accordance with exemplary embodiments.

According to exemplary embodiments, a switching or selecting mechanism is disclosed. A selector circuit 200 that is operable from within the cab portion of a truck tractor in accordance with exemplary embodiments is illustrated in FIG. 2.

Selector circuit 200 includes a trailer park brake valve (TPBV) 210, a solenoid valve 220, inversion valves 230 and 250, a synchro valve 260 and a double check valve 240. While a solenoid is a specific type of valve, any on/off valve (push/pull, toggle, rocker style, etc.) can perform the same function. Therefore, the solenoid is also referred to as a selector valve. Each of the inversion valves 230 and 250 and the synchro valve 260 are "non-exhausting" valves.

TPBV 210 is a push-pull valve (located in the cab portion of the truck) that controls the trailer parking brakes. TPBV 210 determines the state of the spring brakes by supplying (or not supplying) air to the spring brake chambers of the trailer. If the park brakes are applied to stop movement of the truck, air is released from the spring brake chambers and there is no air pressure delivered from TPBV 210. When the spring (i.e. park) brakes are released to permit movement, (compressed or pressurized) air is supplied to the spring brake chamber by the park brake valve. TPBV 210 permits air flow to release the spring brakes (i.e. air is delivered to the spring brake chamber of the trailer). TPBV 210 does not permit air flow when the spring brakes are applied (i.e. air is not delivered to the spring brake chamber of the trailer).

In general, for each of the inversion valves (IV1 230 and IV2 250) and the synchro valve (SV 260), a supply line and a control line determine the delivery as is known. For each of these valves, the supply line is designated as "S", the control line or signal is designated as "C" and the delivery line is designated as "D" in FIG. 2. The supply line may or may not supply air to each of these valves. The state in which the supply line has air may also be referred to as being "high" or "on" or "1". The state in which the supply line does not have air may also be referred to as being "low" or "off" or "0". Similar terminology may also be used for the delivery line (for delivering from the valve). A control signal may be present or may be absent on the control line. The presence of a control signal on the control line may also be referred to as a "high", "on" or "1". The absence of a control signal on the control line may also be referred to as a "low", "off" or "0".

Air is delivered from each of the inversion valves, IV1 230 and IV2 250 (or is "high" or "on" or "1"), when the supply line is "on" and the control signal is "off". Air is not delivered from the inversion valves, IV1 230 and IV2 250, when the supply line is "on" and the control signal is "on". Air is also not delivered from the inversion valves, IV1 230 and IV2 250, when the supply line is "off" regardless of the state of the signal in the control line. State tables for inversion valves (IV1 230 and IV2 250), are illustrated in FIGS. 3A and 3B.

Air is delivered from synchro valve, SV 260, when the supply line is "on" and the control signal is "on". Air is not delivered from synchro valve, SV 260, when the supply line is "on" and the control is "off". Air is also not delivered from synchro valve, SV 260, when the supply line is "off" regardless of the state of the signal in the control line. A state table for synchro valve (SV 260), is illustrated in FIG. 3C.

For the double check valve, DCV 240, air is provided from the line with the higher air pressure. DCV 240 may be viewed as having two supply lines and one delivery line. The supply lines of DCV 240 are designated as S1 and S2 and the delivery line as D in FIG. 2. Supply line S1 receives air from the delivery line of IV1 230 and supply line S2 receives air from the delivery line of SV 260 (i.e. S1 corresponds to D of IV1 230). DCV 240 permits flow of air from one of S1 and S2 based on the supply having the higher pressure.

The choice of full or semi-position may be made with the trailer being attached and the parking or emergency brakes applied (i.e. the truck is stationary). No air flows to the emergency/spring brake chambers as TPBV 210 is not supplying air. The delivery line for TPBV 210 is also designated as D in FIG. 2. Since no air is flowing from TPBV 210, control signal to IV1 230 is "off" as are the supply lines to IV2 250 and SV 260.

The operator may choose either the "full" or "semi" position via a switch (such as switch SW 215) located in the cab portion of the tractor (on the dash for example) that is connected to the solenoid valve 220. In one embodiment, the full position may be chosen by the operator. Air is supplied by the solenoid valve 220 to IV1 230 and therefore, the supply to IV1 230 is "on". Delivery from IV1 230 takes place (since control to IV1 230 is "off") and this air is supplied via (S1 and D of) DCV 240 to the control line of SV 260 as well as to the control line of IV2 250 both of which (i.e. control lines of SV 260 and IV2 250) are "on". Due to lack of air from TPBV 210 (since the parking/spring brakes are applied), the supply to SV 260 is "off" and the delivery from SV260 is also "off". Similarly, supply to IV2 250 (from DCV 240) is "off" and delivery from IV2 250 is "off".

In order to facilitate movement of the truck, the emergency brakes have to be released by providing air to the emergency/park brake chambers. That is, air flows through TPBV 210 and the control signal to IV1 230 changes to "on" and the supply to IV2 250 and SV 260 also change to on As IV1 230 is a non-exhausting valve, once the delivery from IV1 230 is "on" (resulting from the supply being "on" and control being "off"), a change in the control state to "on" does not affect the delivery from IV1 230 and this remains "on".

Since supply to SV 260 is "on" (and the control signal to SV 260 is also "on"), delivery from SV 260 is "on" resulting in air being provided to glad hands associated with the tractor protection valve (full position connection) TPF 280. Additionally, air is delivered from SV 260 (in a feedback loop known as a pneumatic latch) via (S2 and D of) DCV 240 as a control signal "on" to SV 260 (and control signal "on" to IV2 250).

While the truck is in motion or has its parking brakes released, air continues to be supplied to the present connection (i.e. the full position). In the truck's current state, even if a semi position is selected or changed to a semi position (intentionally or accidentally) via SW 215 (connected to solenoid valve 220) and air is no longer supplied by solenoid valve 220 to IV1 230, the feedback via (S2 of) DCV 240 remains "on" and this provides a control signal "on" to SV 260 (as well as control signal "on" to IV) to maintain the supply of air to the glad hands associated with the tractor protection valve (full position connection) TPF 280.

In another embodiment, the semi position can be chosen initially (with the spring brakes being applied) by switch SW 2.15 and the solenoid valve does not provide air. That is, the supply to IV1 230 is "off". Since no air flows from TPBV 210 with the spring brakes applied, control to IV1 230 is also "off". There is no delivery from IV1 230 (i.e. delivery from IV1 230 is "off") and no air is supplied via DCV 240 to the control line of SV260 (as well as to the control line of IV2 250) which are both "off" as a result. Due to lack of air from TPBV 210, the supply to both SV 260 and IV2 250 are "off" and the delivery from SV260 and IV2 250 is also "off".

Once the emergency brakes are released, air is supplied to the spring brake chambers and air flows from TPBV 210. This results in the control signal to IV1 230 changing to "on" and the supply lines to IV2 250 and SV 260 also changing to "on". Delivery from IV1 230 remains "off" since supply (from solenoid valve 220) to IV1 230 is "off". Delivery from SV 260 remains "off" since the control signal to SV 260 is "off" (resulting from delivery from DCV 240 being "off"). Delivery from IV2 250, however, is "on" since control to IV2 250 is "off" while supply to IV2 250 is "on". As a result, air is supplied to glad hands associated with the tractor protection valve (semi position connection) TPS 270.

While the truck is in motion or has its spring brakes released, air continues to be supplied to the present connection corresponding to the selected position (i.e. the semi position). Air flows from TPBV 210 and the control signal to IPV1 230 remains "on". In the truck's current state, even if a full position is selected or changed to a full position (either intentionally or accidentally) by SW 215 and air is supplied by solenoid valve 220 to IV1 230, delivery from IV remains "off". Since no air is supplied to DCV 240, control to SV 260 remains "off" and delivery from SV 260 also remains "off". Air supply continues to tractor protection valve (semi position connection) TPS 270.

The solenoid valve 220, inversion valves IV1 230 and IV2 250, synchro valve SV 260, trailer parking brake valve TPBV 210 and double check valve DCV 240 may all be located on the chassis of the tractor. SW 215 may be located in the cab portion (accessible to the operator) and may be connected to solenoid 220. A trailer that is being hauled by the tractor has glad hand connection(s) connected to one of the glad hand connections of the tractor (i.e. corresponding to the tractor protection valves, TPS 270 or TPF 280) for receiving air to operate the brakes of the trailer depending on the operation of the tractor. Air from the tractor for controlling the service brakes of the trailer is also supplied via the selected one of the tractor protection valves (TPS 270 or TPF 280). TPS 270 and TPF 280 may also be located on the chassis of the tractor and protect the tractor/cab portion from a complete loss of air if the trailer is lost.

In some embodiments, elements of the selector circuit 200 may be substituted with other elements having similar or identical functionality. For example, the second inversion valve (IV2 250) and the synchro valve (SV 260) may be replaced by a pneumatically piloted four-way valve. In such a four-way valve, one supply may be connected to either of two deliveries while the other delivery is exhausted. A four-way valve that achieves the (combined) functionality of IV and SV 360 is known; for example, such a four-way valve is offered by Humphrey Products Company.

Figure 4:
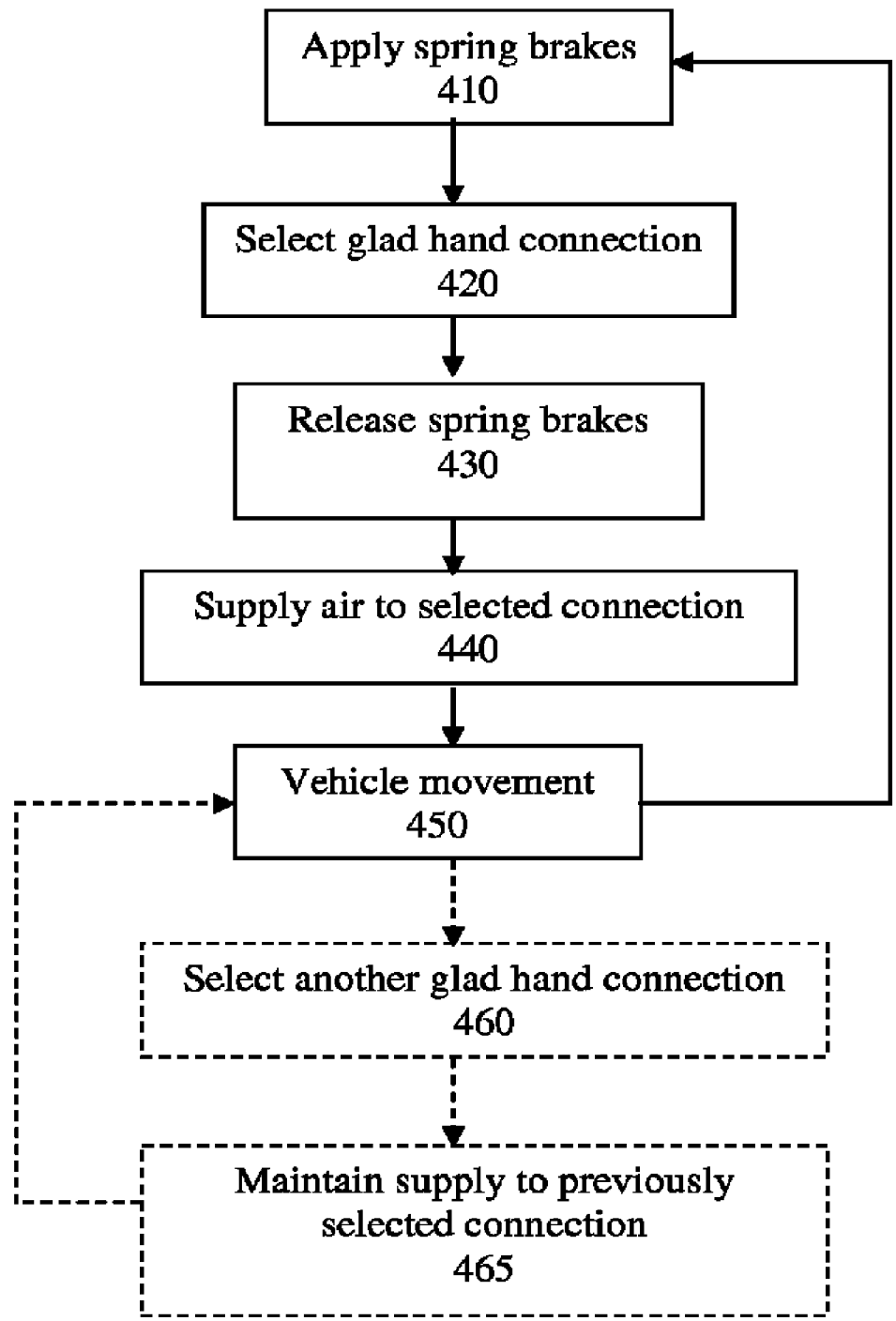
FIG. 4 illustrates a method in accordance with exemplary embodiments.

A method (or process 400) of selecting a glad hand connection for supplying pressurized air to a trailer using the exemplary selector circuit may be described with reference to FIG. 4. The spring brakes of a tractor may be applied or engaged (i.e. pressure from the brake chambers released) at 410. A position for connecting the glad hands may be selected at 420. The position may be the "full" position or the "semi" position. The spring brakes may then be released at 430. Air may be supplied to the glad hands associated with the selected position at 440. The vehicle (i.e. truck) may commence movement at 450 and the air continues to be supplied to the selected position. In other embodiments, while the vehicle is in motion (or while the spring brakes remain released), another position or connection may be selected at 460. This selection, however, will not change the supply to the previously selected position. That is, air will continue to be supplied to the previously selected position at 465. The supply can only be switched from one (i.e. previously selected) connection to another connection after the spring brakes are engaged and a selection of another connection is made.

The term air or pressurized air as used herein may refer to pressurized or compressed air that is needed to apply/release service brakes and spring/parking brakes.

Exemplary embodiments as described enable an operator (of a truck for example) to select from one of a plurality of glad hand connections on the tractor for providing pressurized air to a trailer. The selected glad hand connection may be dependent on the type of trailer being attached to and hauled by the tractor. The selection may be made from within a cab portion of the trailer. Furthermore, once a glad hand connection is selected and the spring brakes are released (and the vehicle is in motion), the air supply cannot be changed to another glad hand connection. The connection from one glad hand can be switched to another glad hand connection only after the spring (or park) brakes are applied (once more), the selection of another glad connection is made and the spring brakes are released.

It will be appreciated that the procedures (arrangement) described above may be carried out repetitively as necessary to control a vehicle. To facilitate understanding, many aspects of the invention are described in terms of sequences of actions. It will be recognized that the various actions could be performed by a combination of specialized circuits and mechanical elements.

Thus, the invention may be embodied in many different forms, not all of which are described above, and all such forms are contemplated to be within the scope of the invention. It is emphasized that the terms "comprises" and "comprising", when used in this application, specify the presence of stated features, steps, or components and do not preclude the presence or addition of one or more other features, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A truck comprising:
   a pressurized air supply system for providing air to one of a plurality of air supply connections; and
   a selector circuit for providing selection to one of the air supply connections, wherein the circuit further comprises:
      a first inversion valve having a supply line connected to a selector valve and a control line connected to a parking brake valve;
      a second inversion valve having a supply line connected to the parking brake valve and a delivery line connected to a first one of the air supply connections;
      a synchro valve having a supply line connected to the parking brake valve and a delivery line connected to a second one of the air supply connections;
      a double check valve with supply lines connected to a delivery line of each of the first inversion valve and the synchro valve and a delivery line connected to a control line of each of the second inversion valve and the synchro valve;
      a first trailer supply connection to the delivery line of the second inversion valve; and
      a second trailer supply connection to the delivery line of the synchro valve.

2. The truck of claim 1, further comprising:
a trailer portion receiving air from a selected one of the air supply connections.

3. The truck of claim 1, wherein the selector circuit provides switching between the air supply connections.

4. The truck of claim 1, wherein the parking brake valve delivers air to release the spring brakes of a trailer and disables switching between the air supply connections.

5. The truck of claim 1, wherein the selector valve supplies air to the first inversion valve when the operator selects the second connection for a trailer.

6. The truck of claim 1, wherein the selector valve does not supply air to the first inversion valve when the operator selects the first connection for the trailer.

7. The truck of claim 1, wherein the double check valve permits air flow from one of two supply lines wherein a first of the supply lines is connected to the delivery line of the first inversion valve and a second of the supply lines is connected to the delivery line of the synchro valve.

8. The truck of claim 1, wherein the air supply connections are glad hand connections with one of the glad hand connections being connected to a glad hand connection of a trailer for supplying air to the trailer.

9. The truck of claim 1, wherein the selector valve is a solenoid valve.

10. The truck of claim 9, wherein the solenoid is connected to a switch located in a cab portion of the tractor.

11. The truck of claim 10, wherein the switch is located in a dashboard of the cab.

12. The truck of claim 1, wherein the first trailer connection corresponds to a semi position of the trailer.

13. The truck of claim 1, wherein the second trailer connection corresponds to a full position of the trailer.

14. The truck of claim 1, wherein the second inversion valve and the synchro valve are replaced by a pneumatically piloted four-way valve.

15. A system for providing air to one of a plurality of air supply connections in a tractor hauling a trailer, the system comprising:
a first inversion valve having a supply line connected to a solenoid valve and a control line connected to a parking brake valve;
a second inversion valve having a supply line connected to the parking brake valve;
a synchro valve having a supply line connected to the parking brake valve; and
a double check valve having supply lines connected to a delivery line of each of the first inversion valve and the synchro valve and a delivery line connected to a control line of each of the second inversion valve and the synchro valve;
a first trailer supply connection connected to a delivery line of the second inversion valve; and
a second trailer supply connection connected to a delivery line of the synchro valve.

16. The system of claim 15, wherein the first trailer connection corresponds to a semi position of the trailer.

17. The system of claim 15, wherein the second trailer connection corresponds to a full position of the trailer.

18. A method of selecting a glad hand connection on a tractor for supplying pressurized air to a trailer, the method comprising the steps of:
applying spring brakes of the tractor;
selecting a first one of a plurality of glad hand connections of the tractor;
releasing the spring brakes;
supplying air only to the selected first glad hand connection; and
maintaining air supply only to the selected first glad hand connection while the spring brakes remain released.

19. The method of claim 18, further comprising the steps of:
selecting a second one of the plurality of glad hand connections without applying the spring brakes of the tractor; and
maintaining air supply only to the selected first glad hand connection.

20. The method of claim 18, further comprising the steps of:
applying the spring brakes of the tractor;
selecting a second one of the plurality of glad hand connections; and
supplying air only to the selected second glad hand connection.

* * * * *

UNITED STATES PATENT AND TRADEMARK OFFICE
CERTIFICATE OF CORRECTION

PATENT NO. : 8,123,306 B2  
APPLICATION NO. : 12/286536  
DATED : February 28, 2012  
INVENTOR(S) : Keith Alan Hurlburt and David Willard Howell Page 1 of 1

It is certified that error appears in the above-identified patent and that said Letters Patent is hereby corrected as shown below:

Col. 4, line 33, please change "on As" to --on. As--.

Col. 4, line 54, please change "IV" to --IV2 250--.

Col. 4, line 59, please change "2.15" to --215--.

Col. 5, line 20, please change "IV" to --IV1 230--.

Col. 5, line 48, please change "IV" to --IV2 250--.

Signed and Sealed this
Twenty-fourth Day of April, 2012

David J. Kappos
*Director of the United States Patent and Trademark Office*